July 6, 1965  E. P. MONROE  3,193,239
SUSPENSION DEVICE
Filed May 21, 1962  3 Sheets-Sheet 1
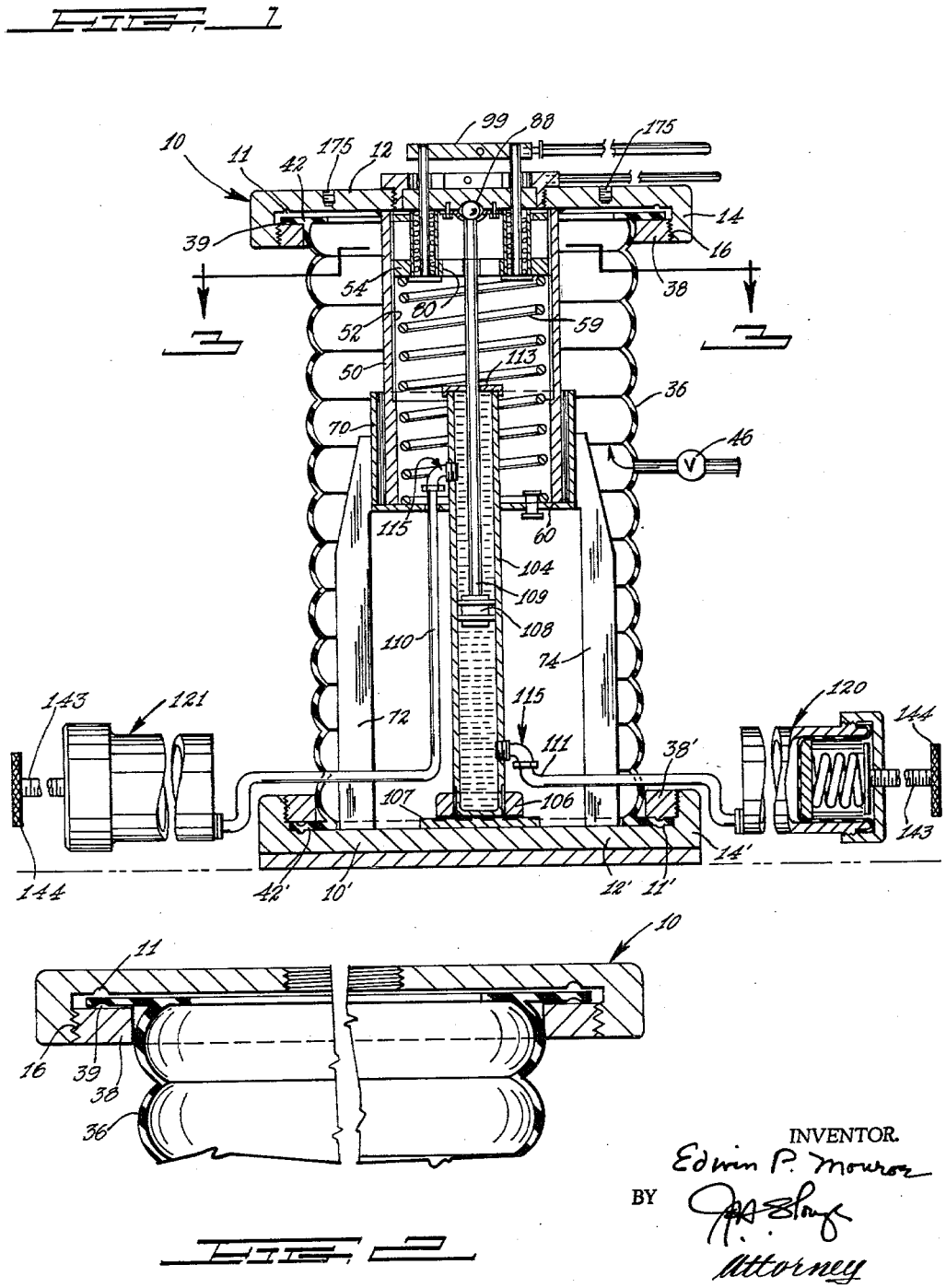
INVENTOR.
Edwin P. Monroe
BY
Attorney July 6, 1965 E. P. MONROE 3,193,239
SUSPENSION DEVICE Filed May 21, 1962 3 Sheets-Sheet 2

INVENTOR.
Edwin P. Monroe
BY
Attorney

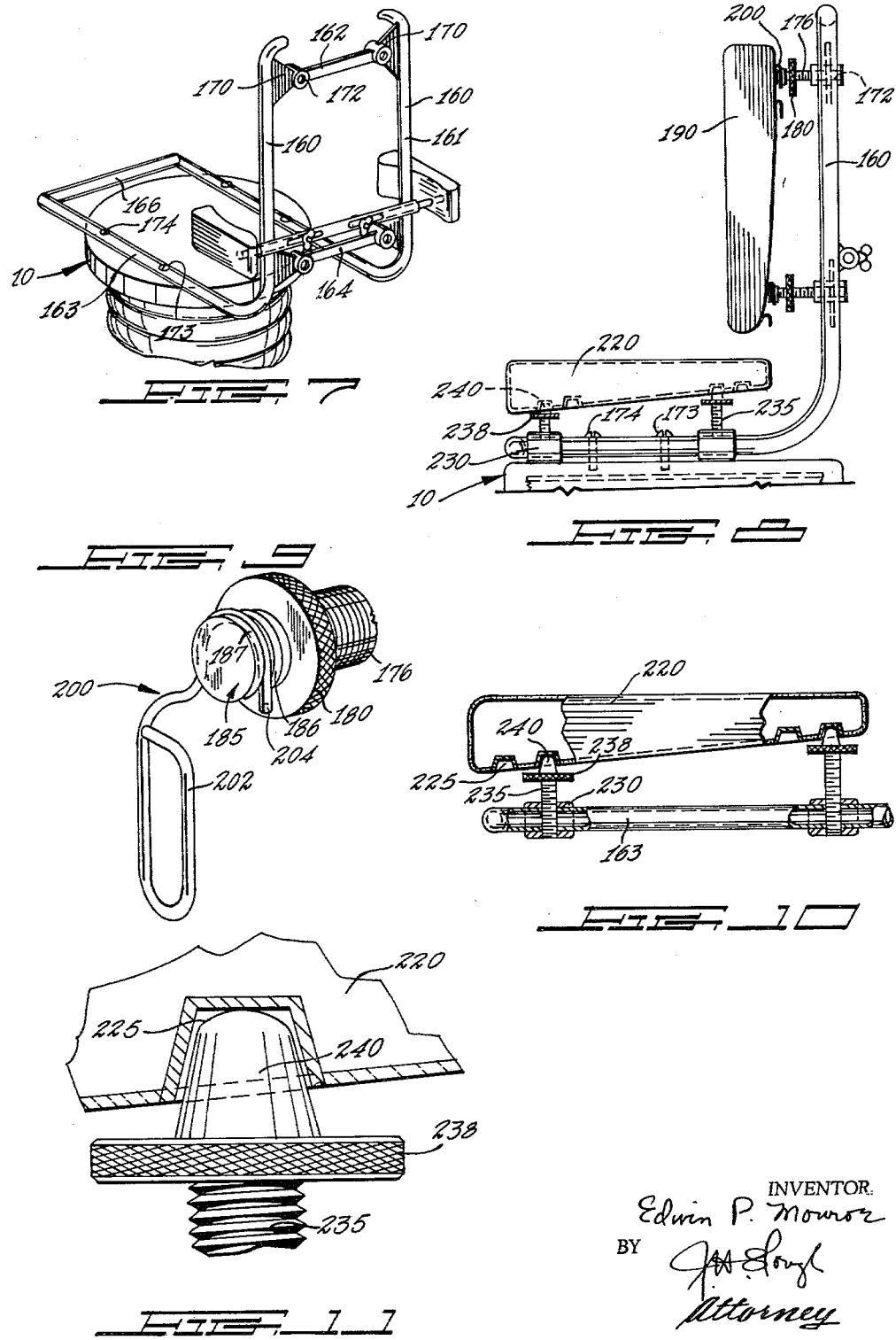

United States Patent Office 3,193,239
Patented July 6, 1965

3,193,239
SUSPENSION DEVICE
Edwin P. Monroe, 255 Barrett Road, Berea, Ohio
Filed May 21, 1962, Ser. No. 196,117
5 Claims. (Cl. 248—400)

My invention relates in general to suspension systems and more particularly to improvements in pneumatic suspension systems.

It is well known that pneumatic suspension systems function in a superior manner when compared to conventional type metal springs. It has also been recognized that pneumatic suspension systems can operate even more advantageously when combined with an hydraulic fluid type dampening mechanism in order to dampen the relative movement between the relatively movable and the relatively stationary parts of the suspension system.

The suspension systems with which I am famililar have marked disadvantages. Initially, the suspension devices have generally been relatively complex and thus uneconomical. Secondly, they have generally been used in combination with conventional shock absorbers and, in certain instances, to supplement existing conventional metal springs.

It is a primary object of my invention to provide improved cushioning means for vehicle seats, particularly for use in trucks, etc.

It is an object of my invention to provide a combination penumatic spring and shock absorber assembly that will function to replace the existing metal spring and conventional shock absorber suspension systems.

It is a further object of my invention to provide a novel combination pneumatic spring shock absorber device that is capable of effective usage with any existing type road vehicle, e.g., an automobile, or for any structure wherein it is desired to cushion or dampen the movement between relatively movable and relatively immovable members, e.g., as a suspension system for truck seats.

A still further object of my invention is to provide a suspension system that has the requisite rigidity and is greatly simplified in design to enhance construction thereof.

Yet another object is to provide a suspension system wherein the inner parts are readily accessible for purposes of adjustment and, if needed, replacements.

These and other objects will become more apparent from the ensuing specification, in which:

FIG. 1 is a vertical cross-sectional view of the suspension system of my invention;

FIG. 2 is an enlarged cross-sectional view and shows more clearly the manner in which the upper portion of the bellows is suspended from the upper plate member;

FIG. 7 is a perspective view showing a tubular seat frame construction which is adapted to have associated therewith the novel suspension system of my invention;

FIG. 8 is a side elevation of the seat frame construction showing the means whereby the seat cushion can be adjustably mounted on the seat frame;

FIG. 9 is an enlarged, perspective view of the novel mounting clip for mounting the rear seat cushion onto the seat frame;

FIG. 10 is a side elevational view, partly in section, showing the adjustable mounting of the bottom seat cushion; and FIG. 11 is an enlarged sectional view showing the adjustable mounting of the bottom seat cushion.

Figure 3:
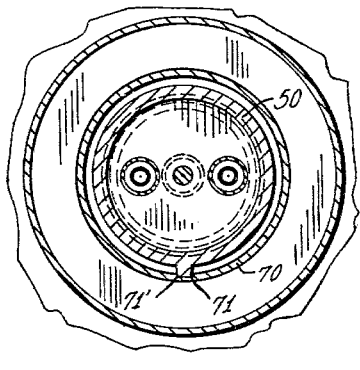
FIG. 3 is a cross-sectional plan view taken on line 3—3 of FIG. 1 and shows more clearly the bearing and cylinder assembly.

Referring now to the drawings in which like reference characters indicate like parts, my novel spring-shock absorber assembly comprises a relatively thin steel plate member 10 which is secured as shown by any suitable means to an immovable frame member. This frame member may comprise the bottom of a truck seat, e.g., or an upper suspension mechanism of an automobile. It is contemplated, however, that my device may be employed between any two surfaces, one of which is relatively movable and the other relatively immovable. For example, it could be employed in automobile, airplane, truck or bus suspension systems, or as a supplementary resilient support means for use with the fifth wheel of semi-trailers.

The relatively movable member is disposed at the upper end of the assembly and secured to a plate member 10 which comprises a top portion 12 and a downwardly extending annular flange portion 14, the inner periphery of the flange member 14 being threaded as shown at 16.

The relatively immovable surface is afforded at the lower end of the assembly in the form shown by a plate member 10' positioned in aligned spaced relation to said upper plate 10, and secured to a stationary generally horizontal surface which is afforded in the form shown in FIG. 1 by the floor of the truck. It will be apparent that the shape of plate members 10 and 10' can be varied or differently positioned to accommodate various shapes and types of frame members to which they may be secured.

A bellows member 36 is adapted to be disposed between the plate members 10 and 10'. An annular threaded ring 38, 38' relatively thin in cross section, is adapted to be slipped around the outside of the bellows and moved into threaded engagement with the threads on the inner peripheries of the plate members 10 and 10'. The bellows member 36 is further provided with upper and lower annular flange members 42, 42' respectively, the outwardly extending portion thereof being adapted to overlie the annular ring members 38, 38'. The under side of the plate member 10 is provided with an annular, relatively shallow recess 11, which is adapted to partially receive a correspondingly shaped annular ring 39 which is fixedly secured to the upper surface of the annular ring 38 so as to provide an airtight fit when the bellows 36 is firmly held in place. As shown in FIG. 2, the portion 42 of bellows 36 is distored by the ring 39, thereby providing the seal between bellows 36 and plate 10.

Thus it will be seen that when the ring 38 is slipped about the bellows 36 and in threaded engagement with threads 16 of plate 10, the tightening of the ring 38 will cause the annular ring 39 to extend into the relatively shallow recess 11 in the plate 10 and thus firmly secure the annular flange 42 of bellows 36 in place, wherefor bellows 36 will be secured to and move upwardly and downwardly with movement of the plate member 10.

The bellows 36 is preferably constructed of a reinforced rubber material, e.g., neoprene rubber reinforced by nylon, the nylon reinforcing serving to limit the expansion of the rubber during usage. A synthetic rubber such as neoprene is preferably employed due to its greater resistance to oil, heat, light and other conditions existing during normal usage of the bellows member.

The cross-sectional thickness of the bellows 36 and the amount of reinforcing required will depend upon the usage of the bellows member. For example, where the suspension is to be used in a truck, the bellows will be thicker in cross section to withstand the higher pressures and weight. Other factors affecting the specific construction of the bellows are whether the suspension system is to be extensively used in extremely hot or extremely cold temperature conditions, the geographic environment, e.g., a very dry environment attended by the presence of large amounts of dust, or a very wet climate, subjecting the bellows to the presence of large amounts of water. Where extremely cold conditions are encountered, e.g., in airplanes, a heater wire may be embedded in the rubber to maintain the temperature of the bellows at desired levels. Similarly, where the bellows is subjected to relatively high pressures and weights, the nylon reinforced rubber can be additionally reinforced by embedding a spring in the nylon reinforced rubber.

The belows is provided with a conventional valve means 46 whereby the bellows 36 may be inflated to the desired pressure.

A cylindrical member 50 is secured to the bottom side of circular portion 12 of plate 10 by means, such as, e.g., welding, and extends downwardly from said circular portion 12 as illustrated. The cylinder 50 is internally threaded along its entire inner periphery as shown in 52 and is thereby adapted to receive a threaded annular disk member 54. The annular threaded disk member 54 is provided with an opening to receive an hydraulic cylinder and a piston rod, said cylinder and said rod forming a part of a closed hydraulic circuit to be described below which provides a dampening for the movement upwardly and downwardly of the movable plate member 10.

A preferably helical coil spring 59 is secured to the bottom of threaded disk 54 by means such as, e.g., welding, said spring 59 extending downwardly therefrom, terminating at and being fixed to a floating bottom plate member 60. The floating plate member 60 is apertured in the center thereof to provide an opening 60′ for an hydraulic cylinder 104, and is of a diameter greater than the diameter of cylinder 50, whereby the outer edges of the plate 60 extend beyond the walls of cylinder 50. As will be more specifically pointed out hereinbelow the outermost edges of plate 60 are adapted to engage the bottom surfaces of a bearing member 70 to limit the upward movement of said plate 60. It will thus be seen that when plate member 10 is moved downwardly due to varying road conditions, the cylinder 50 and plate 60 will also move downwardly. The tension of the spring 59 can be varied by moving threaded disk 54 upwardly or downwardly in a manner to be more specifically described hereinbelow.

It will be noted that the spring 59 limits upward movement of the plate 10 and counterbalances upward force exerted by air pressure within the bellows as supplied through valve means 46.

Figure 4:
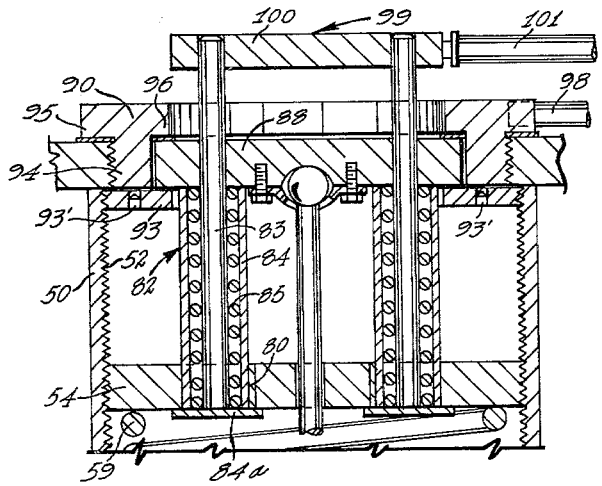
FIG. 4 is an enlarged cross-sectional view showing more clearly certain of the adjusting mechanism of the suspension mechanism.

Referring to FIG. 4, the disk 54 is provided with a pair of openings 80 extending therethrough which are adapted to have mounted therein pin assemblies generally indicated at 82. Each of said pin assemblies 82 comprises a solid cylindrical pin 83, a cylindrical tubular sleeve member 84 telescoped over the lower portion of said pin 83, said cylindrical sleeve 84 terminating in a cap-like portion 84a, the tubular main body portion of the member 84 being loosely mounted in the opening 80 in the disk 54. As shown in FIG. 4, a coil spring 85 is telescoped over the cylindrical pin 83 and said pin 85 is secured, as by spot welding, to the disk 88 seating upon the portion 84a of the sleeve wherefor said sleeve is caused to exert spring pressure against the disk 54 to prevent any interference with the spring action of the spring 59. It will thus be seen that there can be relative movement between the pin 83, which extends upwardly through and is welded to disk 88, and the sleeve member 84 which is loosely mounted around the pin 83.

As explained above, the pin 83 extends upwardly through openings formed in the disk 88 and is welded to the disk 88 whereby the pins 83 and the disk 88 operate as a unit. As shown in FIG. 4, the uppermost portions of pins 83 extend upwardly above the top surface of the disk 88, thereby allowing a suitable tool 99 to be placed over the uppermost portions of pins 83 in order to rotate said pins and thereby rotate the disk 54.

The disk 88 is prevented from moving upwardly or downwardly by means of cap 90 and steel clip disk 93. The steel clip disk 93 is an annular member which contains a central opening of a diameter sufficient to accommodate the rotative movement of pins 83. The clip 93 is sufficiently thin to enable the same to be threaded into the interior of the cylinder 50 by merely rotating the same in a clockwise direction whereby the clip is moved downwardly along the threads of the inside face of the cylinder 50. The lowermost portion of disk 88 is adapted to sit on the upper face of the steel clip disk 93. In order to provide a means for rotating the disk, said disk may be preferably provided with a plurality of openings shown at 93′ whereby a suitable tool can be inserted in the openings in order to rotate the steel clip disk 93.

The cap member 90 is annular in shape and has a downwardly depending annular flange 94 which is threaded on the outer face thereof, the outer diameter of the annular flange 94 corresponding in size with the interior diameter of the opening forming in the top portion 12 of plate 12, whereby the cap 90 can be threaded into plate 10 as shown in FIG. 4. The cap 90 has an outer flange 95 which serves to limit the downward movement thereof. The cap 90 is further provided with an inner flange 96 which is adapted to contact the upper surface of the disk 88 adjacent the periphery thereof. The under side of flanges 95 and 96 are preferably provided with suitable gasket means whereby the downward rotative movement of cap 90 can seal the contact areas between flange 95 and the top plate 10 and flange 96 and the top of the disk 88, thereby preventing the air under pressure in the bellows 36 from escaping through the cap assembly. When cap 90 is in its sealed position, the flange 96 of the cap 90 forces the disk 88 downward a slight amount whereby the bottom surface of the disk 88 is firmly seated on the upper portion of the spring steel clip disk 93.

It will be apparent that the cap 90 can be rotated by any suitable means, the manner of rotating the same being dependent upon the environment in which my novel suspension system is used. For example, the flange 95 of cap 90 may be hexagonal shaped whereby a suitable hexagonal wrench could be employed and positioned around the flange 95 to rotate the same. A further means of rotating the cap 90 is shown in FIG. 4 and includes a handle 98 preferably inserted in one of a plurality of openings in the periphery of the cap 90, said handle 98 extending outwardly from the flange 95, whereby the operator can merely grasp the same and rotate the same in the desired direction.

As noted above, the disk 54 can be moved upwardly-downwardly through the employment of a suitable tool adapted to contact pins 93 and cause rotation of the same. One such tool is shown in FIG. 4 at 99 and comprises a circular body portion 100 provided with a pair of openings to accommodate pins 93, said tool further including a handle portion 101 which can be grasped by the operator and rotated in the desirable direction.

During normal usage of my suspension device, the spring 59 will be set at a predetermined position by means of the disk 54, such position depending upon such factors as the weight of the individual and the amount of pressure within the bellows 36. When the position of spring 59 has been so set, the cap 90 will be rotated downwardly by means of the handle 98, whereby the above described gaskets mounted on the under side of flanges 95 and 96 will cause the cap 90 to seal the upper portion of the cylinder 50 as described above. When the cap 90 is so sealed, rotation of disk 88 is precluded. When it is desired to move the disk 54 upwardly or downwardly to vary the spring tension of spring 59, the handle 98 is rotated counterclockwise thereby moving cap 90 upwardly and unsealing the cap from the plate 10 and from the disk 88. This upward movement of cap 90 frees the disk 88 whereby the subsequent positioning of tool 99 over the pins 93 and rotation of the same causes the pins 93 to be rotated thereby rotating the disk 54 in the desired direction. Subsequent to the moving of the disk 54 to the desired position, the cap 90 is again moved downwardly by means of the handle 98 to a sealed position in the aforesaid manner.

Telescoped around cylinder member 50 and spaced therefrom is an annular bearing member 70, the spacing between said members allowing for freedom of reciprocation of the cylinder 50 while at the same time controlling the limits of lateral movement of the cylinder 50. The annular bearing member 70 is secured to a lower plate member 10′ by means of brace members 72 and 74. The top of annular bearing member 70 limits the downward movement of the plate 10, i.e., plate 10 can move downwardly until the bottom thereof contacts the top of bearing 70.

The cylinder 50 is provided with a key 71, referring to FIG. 3, extending from the periphery thereof which is adapted to be loosely received in a correspondingly shaped keyway 71′ in bearing member 70, whereby rotation between the cylinder 50 and the annular bearing member 70 is prevented. As will be apparent, the prevention of rotation between cylinder 50 and bearing 70 will likewise prevent rotation of bellows member 36, which greatly reduces stresses in the said bellows member.

A hollow hydraulic cylinder 104 is threaded in a threaded collar 106, said collar being secured to a center portion of the bottom plate 10′ by any suitable means, a resilient cushion 107 being preferably interposed between the lowermost end of the cylinder 104 and plate 10′ in order to afford a cushioned mount therefor. The cylinder 104 extends longitudinally and vertically upwardly into the center of the spring chamber 50, passing through the opening 60′ in the floating plate member 60. It will also be noted that the cylinder 104 extends upwardly into the coil spring 59. The cylinder 104 is adapted to contain a hydraulic fluid, the hydraulic fluid serving to provide a dampening effect in a manner to be explained below. A piston 108 is reciprocably mounted in the cylinder 104 and is adapted to be reciprocated by means of a piston rod 109. Piston rod 109 extends upwardly through threaded disk 54 and terminates in a ball joint type connection with the disk 88, thereby allowing for movement between disk 88 and rod 109. Piston rod 109 and piston 108 are adapted to move upwardly and downwardly in accordance with corresponding reciprocation of the plate member 10, whereby piston 108 will reciprocate within the cylinder 104.

Referring now to the specific structure of the shock absorbing mechanism, the hydraulic system is a closed one and preferably comprises, in addition to cylinder 104 a pair of hydraulic cylinder housings generally indicated at 120 and 121, one such housing 121 being flow connected to the upper portion of cylinder 104 through conduit line 110 and the other said housing 120 being connected to the lower portion of the cylinder 104 through a similar fluid conduit line 111. The cylinder 104 is sealed at the upper end thereof by means of a cap 113 having an opening in the center thereof sufficient in diameter to accommodate the piston rod 109. A sealing gasket is preferably provided around the annular opening in the cap 113 in order to seal the cylinder 104 at the upper end thereof. It will be obvious that the cylinders 120, 121 may be of any preferred size or shape and may be positioned either externally of the bellows or seat assembly, as shown, or internally thereof, if desired, the particular form and positioning thereof being immaterial.

Flow control valves generally indicated at 115 in FIG. 1 are mounted in openings in the walls of the cylinder 104 and control the flow thereto and therefrom in the manner to be described below. In a manner to be made more apparent hereinbelow, downward movement of piston 108 in cylinder 104 causes hydraulic fluid positioned below said piston 108 to be forced through fluid conduit 111 into the cylinder housing 120. The downward movement of the piston 108 causes a substantial reduction in pressure immediately thereabove, whereby the hydraulic fluid under pressure in the cylinder housing 121 is returned to the area in cylinder 104 above the piston 90 by way of the fluid conduit 110 and valve 115.

Figure 5:
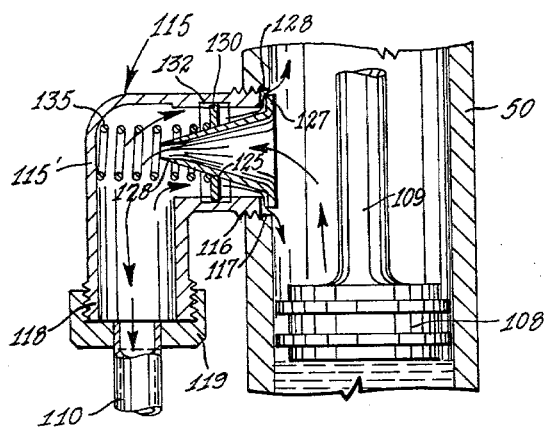
FIG. 5 is an enlarged sectional view showing more clearly the construction of the hydraulic cylinder and flow control valve associated therewith.

Referring now to FIG. 5 and the specific construction of each of the identically constructed valves 115, the uppermost said valve 115 is positioned in an opening in the wall of the cylinder 104, the valve 115 being threaded at 116, said threads 116 being adapted to threadedly engage threads 117 provided in an opening in the side wall of tube 104. The opposite end 118 of valve 115 is similarly threaded, and is adapted to threadedly receive a threaded coupling 119 which in turn is secured to the conduit 110 by any suitable means. The generally L-shaped valve housing 115′ has a valve 125 mounted therein, which comprises a flange portion 127 which is adapted to be seated in a groove 129 provided in the innermost end of the valve housing 115. The valve 125 tapers downwardly from the flange 127 and terminates in a relatively small diameter end portion 128 which forms a relatively small opening. Integrally mounted on the exterior surface of the valve 125 are a plurality of pins 130, preferably two in number, said pins extending into correspondingly shaped slots 132 provided in the valve housing 115′. The end portions of the slots 132 limit the movement of pins 130 whereby the movement of valve 125 is limited to the length of the slots 132. The width of slots 132 is slightly greater than the diameter of pins 130 in order to prevent undue friction therebetween, the slot widths, however, being not sufficiently wider to enable the valve 125 to rotate relative to the valve housing 115.

A compression spring 135 has its forward end convolution connected to pins 130 and its rearmost end convolution connected to the inner wall of the valve housing 115′ whereby said spring 135 biases valve 125 toward a seated arrangement wherein flange 127 is seated in the groove 129 in the valve housing 115′. When valve 125 is in a seated position, hydraulic fluid flowing thereinto from above piston 108 flows into the center portion of the valve 125 and outwardly through the bottommost portion 128 of the valve 125. It will be noted that the fluid flowing into the valve 125 from the cylinder 104 will contact the front surface of flange 127 thereby supplementing the action of the spring 135 in seating the valve 125 against the groove 129 in the valve housing 115′.

It will be noted that the piston 108 moves upwardly at the completion of the cycle of movement of the suspension device. The position 108 is normally in an upwardly biased position due to the air pressure within the bellows 36. However, when a rough road surface or road undulation is encountered, the plate member 10 moves downwardly whereby the piston rod 109 and piston 108 likewise move downwardly. In this downward movement hydraulic fluid positioned below the piston 108 is forced into the lowermost valve 115 and flows therethrough in the manner described above whereby said hydraulic fluid flows through line 111 into the hydraulic cylinder 120. After the road undulation or rough pavement has passed, the air which has been compressed within bellows 36 will cause, due to the increased pressure therein, the upper plate member 10 to move upwardly, thereby moving piston rod 109 and piston 108 upwardly. Thus the hydraulic fluid above piston 108 will flow into the uppermost valve 115 in the manner illustrated in FIG. 5 and described above. When the piston 108 reaches its normal or balanced position within cylinder 104 the fluid will cease flowing into the valve housing 115 mounted at the upper portion of cylinder 104. In this neutral position both of the hydraulic cylinders 120 and 121 will contain hydraulic fluid, the amount thereof depending on factors to be described more in detail hereinbelow when specific reference is made to the construction of the hydraulic cylinders. As the piston 108 moves downwardly subsequent to a subsequent confrontation with rough pavement or similar road conditions, the hydraulic fluid contained in the hydraulic cylinder 121 will be caused to flow upwardly through line 110 into the uppermost valve 115, due to the difference in pressure between the pressure within the hydraulic cylinder 121 and the pressure immediately above the piston 108. As noted above, the downward movement of piston 108 will cause a reduction in pressure immediately thereabove, thereby unbalancing the pressure equilibrium and resulting in the hydraulic fluid within the hydraulic cylinder 121 moving to the area of lower pressure immediately above the piston 108. As will be further explained below, the cylinders 120 and 121 are constructed to enhance the flow of the fluid from the tanks 120 and 121 to the cylinder 104. As the hydraulic fluid moves upwardly in conduit 110 into the upper valve 115, the majority of the fluid will flow into the area around the opening 128, thereby flowing into the tapered area formed by the valve 125 and the inner wall of the valve housing 115′ adjacent said valve 125. The pressure caused by this hydraulic fluid will force the valve 125 outwardly against the bias of spring 135, thereby unseating the same from the groove 129 and enabling the hydraulic fluid to flow into the cylinder 104 in the area above the piston 108. It will be noted that the hydraulic fluid enters the cylinder 104 in an annular flow pattern through the annular opening between flange 127 and the end of valve housing 115′. This annular flow pattern results in very slight turbulence within the cylinder 104. It will be noted that there is nothing to prevent the hydraulic fluid from flowing from line 110 into the cylinder 104 through the relatively small diameter end portion 128 of the valve 115. However, experience has shown that the relatively small diameter end portion 128, compared to the relatively large opening therearound, bounded by the inner walls of the valve housing 115′, enables only a relatively insignificant portion of the hydraulic fluid to flow through the opening 128. Moreover, the flowing of the hydraulic fluid through end portion 128 is not objectionable as long as there is sufficient fluid flowing around the valve in order to provide sufficient pressure to unseat the valve from the annular opening 128 in the valve housing 115.

Figure 6:
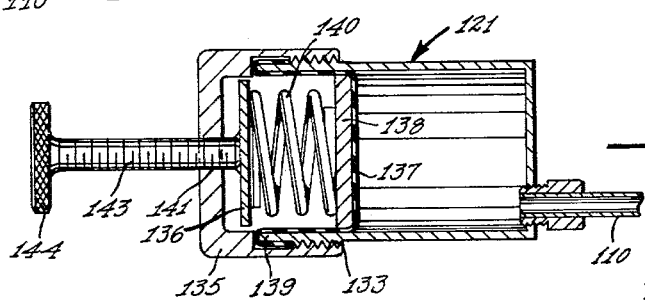
FIG. 6 is an enlarged cross-sectional view of an hydraulic cylinder housing which forms part of the hydraulic circuit of my suspension system.

The hydraulic cylinders 120 and 121, previously referred to, are identical in all respects whereby the description of one will lead to a complete understanding of the structure and operation of both of said hydraulic cylinders. Referring to FIG. 6, the hydraulic cylinder 121 has connected to one end portion thereof the conduit 110. The manner in which the conduit 110 is connected to the hydraulic cylinder 121 does not form a part of the invention, any suitable conventional connecting means being employed. It is, however, necessary to seal the connection so as to maintain a predetermined pressure relationship within the hydraulic system. The hydraulic cylinder 121 is threaded as shown at 133 and is adapted to receive an internally threaded cylinder cap 135. A resilient, preferably rubber, diaphragm 137 is positioned around the annular upper edge 139 of the cylinder 121 and is adapted to be maintained in position over said edge 139 when the cap 135 is rotated clockwise to a position wherein the inner annular wall of cap 135 contacts the outer annular wall of the cylinder 121 and the diaphragm 137 positioned thereover. An adjustment screw 143 having a knob 144 secured to the outer end thereof is threaded into an opening 141 of the cap 135 and is provided with an annular disk 136 at its inner end, said disk being of slightly less diameter than the inner diameter of cylinder 121. A second disk similar in shape to disk 135 is shown at 138 and is separated from disk 135 by means of a coil spring 140. The bottom surface of the disk 138 is in engagement with the diaphragm 137. It will therefore be seen that when the diaphragm 137 is positioned over the end of the cylinder 121 and the cap 135 is rotated inwardly thereby holding the diaphragm 137 against the end of the cylinder 121, the disk 138 will force the diaphragm 137 downwardly in the manner shown in FIG. 6. As will also be apparent, movement of the adjusting screw 143 will adjust the tension on the spring 140. Thus, if the adjusting screw 133 is rotated clockwise, disk 136 will likewise be rotated clockwise and moved inwardly thereby moving disk 138 inwardly under the pressure exerted by spring 140, thereby stretching the diaphragm 137 and thereby reducing the effective volume within the cylinder 121, the effective volume referring to the volume of the cylinder 121 containing hydraulic fluid.

It will therefore be seen that by varying the positioning of the adjusting screw 143, by means of knob 144, in both of the hydraulic cylinders 120 and 121, the pressure within the closed hydraulic system can be varied. Thus, by moving the disks 136 and 138 toward the bottom of the cylinders 120 and 121, the volume of the closed hydraulic system will be reduced thereby increasing the pressure of the hydraulic fluid within the system. This may be desirous when a relatively heavy person is driving a truck having associated therewith the novel suspension means of my invention. In a similar manner, the increasing of the volume within the hydraulic fluid system is achieved by the moving of the disks 136 and 138 toward the open end of the hydraulic cylinders 120 and 121, thereby decreasing the pressure in the hydraulic system, which may be desirable when a relatively light individual is employing the suspension device of my invention.

In addition to providing a suspension device consisting of a pneumatic suspension combined with the hydraulic fluid shock-absorbing mechanism, I have provided a novel seat mounting structure wherein the bottom and back cushions of the truck seat can be variably adjusted to meet the needs of the individual. Referring initially to FIG. 7, the seat frame as illustrated comprises a pair of tubular members 160 which are interconnected by means of a plurality of brace members 162, 164 and 166. The tubular members 160 are generally L-shaped and include a substantially vertical leg portion 161 and a substantially horizontal leg portion 163. Mounted on the substantially vertical leg portion 161 are a plurality of brackets 170 which extend inwardly from the vertical tubing 161 and are preferably connected to said tubing by means of welding. Each of said brackets 170 has secured thereto a threaded nut 172, said threaded nut 172 being preferably secured to the bracket 170 by means of welding. Each of said threaded nuts 172 is adapted to have threadedly mounted therein a threaded rod member 176 which is adapted to adjustably extend into the threaded nut 172, the position thereof depending, as will be obvious, upon the direction of rotation and the extent of rotation. Referring now to FIGS. 8 and 9, each rod 176 has integrally secured thereto an adjusting handle 180 and a spool-shaped spacer element 185, both the adjusting handle 180 and the spacer element 185 being preferably connected by means of welding to the threaded rods 176. It will therefore be apparent that rotation of the adjusting handle 180 will cause corresponding rotation of the rod 176 and the spacer element 185, whereby the spacer element 185 can be extended or retracted relative to the threaded nut 172.

The back or top cushion 190 has secured thereto on the back thereof a plurality of spring clips 200, preferably four in number positioned at each corner of the cushion, each of said spring clips including a generally loop-shaped portion 202 which is secured by any suitable means to the back of the cushion 190 and a bifurcated leg portion 204, the spaced legs of the bifurcated leg portion 204 being adapted to contact a reduced diameter central portion 186 of the spool 185. The spool 185 further includes relatively large diameter end portions 187, said end portions being of a larger diameter than that of the bifurcated leg portion 204 of the spring clips 200 whereby said legs are confined in their movement in a direction parallel to the axis of rod 176 by the relatively larger diameter flange portions 187. It will thus be apparent that rotation of the adjusting handle 180 causes, depending upon the rotation thereof, one of said flanges 187 to contact the bifurcated leg portion 204 of the spring clips 200, whereby said flanges can move said bifurcated leg portion in that direction.

As shown in FIG. 8, the rear or back cushion 190 is supported in position solely through the coaction of the spring clips 200 and the axially movable spacer elements 185. The openings formed by the bifurcated portions 204 of the spring clips 200 will extend in the same direction whereby the back cushion can be easily removed by merely sliding the cushion sideways whereby the spring clips 200 are positioned outwardly of the spacer elements 185. It is contemplated that a second series of four spring clips be positioned on the back of said rear cushion spaced from said first series of spring clips whereby the rear cushion can be adjusted vertically by causing said second series of spring clips to coact with said spacer elements 185. It will thus be seen that to mount the rear cushion 190 onto the cushion mounting assembly all that is required is that said rear cushion, and particularly the open end of the bifurcated leg portions thereof, be positioned adjacent the spacer elements 185 whereby subsequent sideways movement of said cushion and spring clips mounted thereon will cause said bifurcated leg portions 204 to extend around the central portion 186 of the spacer elements 185. When the seat cushion is so mounted, rotation of the adjusting handle 180 to cause said spring clips 200, and thus said rear cushion, to move toward or away from the threaded nuts 172 whereby the inclination of said rear cushion can be easily adjusted. It will be noted that each corner of the rear cushion can be adjusted independently of the other corners whereby the rear cushion can be carefully adjusted to the desired position by the operator.

Referring to FIG. 10, the bottom cushion 220 is also adjustable upwardly and downwardly, as well as forwardly and rearwardly. Each corner of the bottom cushion 220 is provided with a plurality of annular recesses 225, preferably two in number. The forward extending tubular members 163 are provided with threaded nut members 230 which are slidably mounted over tubular members 163. Each of said threaded nuts 230 has threadedly mounted therein an upwardly extending threaded rod 235, each of said rods 235 being provided adjacent the uppermost end thereof with adjusting handles 238 which are suitably secured to the rods 235 and rotatable therewith. Each of said rods 235 has provided on the extreme forward or upper end thereof a hard steel cap 240 which is adapted to contact the bottom of the annular recess 225 as shown in FIG. 11. It will therefore be apparent that rotation of the adjusting handle 238 will cause said rods 235 to move upwardly or downwardly depending upon the direction of rotation whereby the seat correspondingly moves upwardly or downwardly through contact with said hard steel cap 240 with the bottom of the annular recess 225. In the same fashion as described above with reference to the rear cushion adjustment construction, each of said rods 235 are separately adjustable whereby each corner of said bottom cushion can be adjusted to accommodate the specific inclination desired by the operator. As noted above there are preferably provided two such annular recesses 225 in each corner of said bottom cushion whereby said bottom cushion can be positioned in either group of four openings in order to provide for adjustability of said bottom cushion forwardly or rearwardly. It will thus be noted that the bottom cushion is held in place solely by gravity and removal thereof can be accomplished merely by lifting said bottom cushion.

The size and shape of cylinders 120–121 can be altered, and same cylinders can be placed inside bellows in certain applications.

It will thus be seen that I have accomplished the objects of my invention. I have provided a pneumatic suspension system in combination with a hydraulic fluid dampening mechanism, the entire mechanism providing a highly effective suspension device capable of adaptation between relatively movable and relatively immovable members. The suspension device is readily adjustable, highly simplified in design and inexpensive to manufacture.

What I claim as my invention is:

1. A suspension device of the type described comprising a first plate member secured to an immovable frame member, a relatively movable member secured to a second plate member having a downwardly extending annular flange portion, a bellows adapted to be interposed between said first and second plate members, said bellows adapted to be seated within an annular relatively shallow recess provided in the underside of the second plate member, a first cylinder secured to the bottom of said second plate member and telescoped within said bellows, a piston and piston rod connected to said piston, which piston is disposed within said cylinder the opposite end of said rod being swivelably secured to the said second plate member, spring means telescoped over said piston rod, a centrally apertured circular plate, said spring secured at one end to said circular plate, a hydraulic cylinder secured to the first plate member extending longitudinally and vertically into the first said cylinder passing through the central aperture in said circular plate, the piston rod and second plate being biased normally in an opposite direction from the first plate by a predetermined air pressure within the bellows, and moved toward said first plate upon force being applied to said second plate in a direction opposite to the said bias direction, the hydraulic cylinder acting as a shock-absorbing means, said spring counterbalancing force exerted by air pressure within the said bellows.

2. A combination pneumatic and shock absorber assembly for vehicle seats comprising a plate member secured to the frame of a vehicle, a second plate positioned in aligned spaced relation above said first plate member, a seat secured above said second plate, a bellows member adapted to be disposed between the said plate members, said bellows being provided with valve means whereby said bellows is inflated to a desired pressure, a cylindrical member secured to the bottom of said second plate member extending downwardly thereof, a centrally apertured annular disk member secured to said cylindrical member, a hydraulic cylinder and piston means, a centrally apertured circular plate, an annular bearing member secured to the first plate member, the piston means adapted to be telescoped through said disk and said circular plate, spring means secured to said second plate member and to said circular plate, said bearing member limiting upward movement of the circular plate, the said hydraulic cylinder secured to said first plate member dampening downward movement of said seat, said spring counterbalancing upward force exerted by air pressure within the said bellows.

3. The combined pneumatic and shock absorbent assembly of claim 2 characterized by the bellows being constructed of rubber or rubber-like material.

4. The structure claimed in claim 2 wherein second spring means are interposed between said second plate and said annular disk member, means for rotating said annular disk to vary the tension of said first recited spring.

5. The structure claimed in claim 2, wherein said circular plate is keyed to the annular bearing member to prevent rotation thereof.

References Cited by the Examiner
UNITED STATES PATENTS

| | | | |
|---|---|---|---|
| 2,536,626 | 1/51 | Coleman | 267—64 |
| 2,880,782 | 4/59 | Conner | 248—399 |

FOREIGN PATENTS

| | | |
|---|---|---|
| 1,041,527 | 5/13 | France. |
| 1,174,491 | 11/58 | France. |

CLAUDE A. LE ROY, *Primary Examiner.*